(12) United States Patent
Singh et al.

(10) Patent No.: US 8,745,637 B2
(45) Date of Patent: Jun. 3, 2014

(54) MIDDLEWARE FOR EXTRACTING AGGREGATION STATISTICS TO ENABLE LIGHT-WEIGHT MANAGEMENT PLANNERS

(75) Inventors: Aameek Singh, University Place, WA (US); Sandeep Madhav Uttamchandani, San Jose, CA (US); Yin Wang, Ann Arbor, MI (US)

(73) Assignee: International Business Machines Corporation, Armonk, NY (US)

( * ) Notice: Subject to any disclaimer, the term of this patent is extended or adjusted under 35 U.S.C. 154(b) by 602 days.

(21) Appl. No.: 12/622,737

(22) Filed: Nov. 20, 2009

(65) Prior Publication Data

US 2011/0126219 A1    May 26, 2011

(51) Int. Cl.
*G06F 3/00* (2006.01)
*G06F 9/44* (2006.01)
*G06F 9/46* (2006.01)
*G06F 13/00* (2006.01)

(52) U.S. Cl.
USPC ........................................ 719/318; 719/320

(58) Field of Classification Search
USPC ........................................... 707/10; 709/223
See application file for complete search history.

(56) References Cited

U.S. PATENT DOCUMENTS

| | | | |
|---|---|---|---|
| 6,826,571 B1 * | 11/2004 | Baer et al. ...................... | 709/203 |
| 6,851,089 B1 * | 2/2005 | Erickson et al. ............... | 715/255 |
| 2004/0139191 A1 | 7/2004 | Chambliss et al. | |
| 2005/0086263 A1 | 4/2005 | Ngai et al. | |
| 2005/0210331 A1 | 9/2005 | Connelly et al. | |
| 2005/0210477 A1 * | 9/2005 | Auerbach et al. ............. | 719/315 |
| 2006/0271677 A1 | 11/2006 | Mercier | |
| 2007/0094384 A1 | 4/2007 | Matsumura et al. | |
| 2007/0192065 A1 | 8/2007 | Riggs et al. | |
| 2007/0192465 A1 * | 8/2007 | Modarressi .................... | 709/223 |
| 2007/0288633 A1 | 12/2007 | Mullarkey | |
| 2009/0119301 A1 * | 5/2009 | Cherkasova et al. ............ | 707/10 |

OTHER PUBLICATIONS

Fontijn et al, AmbientDB: P2P Data Management Middleware for Ambient Intelligence, PERWARE, 2004, pp. 1-5.*
Wang, Efficient Storage Management for a Temporal Performance Database, Technical Disclosure Bulletin, No. 2, Jul. 1992, p. 357-361.

* cited by examiner

*Primary Examiner* — Diem Cao
(74) *Attorney, Agent, or Firm* — Lieberman & Brandsdorfer, LLC

(57) ABSTRACT

Management of a planner through use of a middleware layer. A computer system is configured with the middleware layer in communication with both a planner and a data repository. One or more modules are provided in the middleware layer to support the functionality of the planner. Application program interface calls are employed to call the modules, thereby mitigating duplication of the functionality in separate planners.

20 Claims, 2 Drawing Sheets

MIDDLEWARE FOR EXTRACTING AGGREGATION STATISTICS TO ENABLE LIGHT-WEIGHT MANAGEMENT PLANNERS

BACKGROUND

1. Technical Field

This invention relates to configuring a planner to communicate with a data repository through a middleware layer. More specifically, the invention mitigates the complexity of the planner by employing placement of modules and services in the middleware layer; with the middleware layer configured to support functionality of the planner maintained in the components of the middleware layer.

2. Background of the Invention

It is recognized in the art of computer programming to employ utilities within an application to assist with performance of a particular task. Such utilities are known as wizards, or in one embodiment as a planner. Wizards have evolved in the environment of individual computing systems and are employed as user interface elements, where the user is presented with a sequence of dialog boxes. Through these dialog boxes, the user is led through a series of steps, performing tasks in a specific sequence.

Planners have expanded beyond the personal computer environment and are now employed in distributed computer systems, where they search for options associated with management of data and provide decision making guidance. There are different categories of planners employed in a distributed computing environment, including but not limited to management planners, provisioning planners, and problem determination planners. A management planner is known to present a solution to a system administrator by searching infrastructure devices, paths, and configuration for specified criteria. A provisioning planner returns a candidate storage controller and server that can be used to deploy a new application within the structure of a service level agreement (SLA). A problem determination planner assists with determining the basis for a violation of a SLA. These planners utilize information aggregated from historical information and performance data.

In general, the planners are heavy weight processes that utilize advanced statistical techniques for modeling. Each planner is an independent optimization module. In one embodiment, planners are unique to the associated data repository. More specifically, different data repositories employ proprietary schemas, i.e. heterogeneous. The planners that communicate with these data repositories are not inter-operable across heterogeneous data repositories.

BRIEF SUMMARY

The embodiment of the present invention comprises a method, system, and article for configuration of a planner through placement of functionality modules in the middleware layer of a computer system.

In one aspect of the invention, a method is provided for configuration of a planner. A computer system is configured with the planner in communication with a data repository through a middleware layer. Information management functionality is extracted from the planner and placed in the middleware layer. This includes providing a one or more information aggregation modules within the middleware that is shared with each planner. The information aggregation modules include, but are not limited to, an information module for defining and extracting information constructs from raw data, and an information management service module for encapsulating the extracted raw data into high level information constructs. The planner employs at least one of the shared information aggregation modules of the middleware through use of an API call.

In another aspect of the invention, a computer system is provided with a processor in communication with memory and a data repository. A planner is provided in communication with the middleware layer through which it accesses the data repository. The middleware layer has a plurality of information aggregation modules to share with each planner. Information aggregation modules include, but are not limited to an information module to define and extract information constructs from raw data, and an information management service module to encapsulate the extracted raw data into high level information constructs. The planner employs at least one of the shared information aggregation modules of the middleware through an application program interface call (API).

In yet another aspect of the invention, an article is provided with a computer-readable carrier including computer program instructions to configure a planner in communication with a data repository through a middleware layer. Instructions are provided to extract information management functionality from the planner and place the functionality in the middleware layer. The functionality of the middleware layer is provided by one or more information aggregation modules to share with each planner. The modules include instruction to define and extract information constructs from raw data and instructions to encapsulate the extracted raw data into high level information constructs. The planner employs at least one of the shared information aggregation modules of the middleware through an API call.

In an even further aspect of the invention, a method is provided for invoking a planner through middleware. A computer system is configured with the planner in communication with a data repository through a middleware layer. Information management functionality is extracted from the planner and placed in the middleware layer. The information management functionality includes an information aggregation module and an information management service module. The planner calls at least one of the modules through an API call.

Other features and advantages of this invention will become apparent from the following detailed description of the presently preferred embodiment of the invention, taken in conjunction with the accompanying drawings.

BRIEF DESCRIPTION OF THE SEVERAL VIEWS OF THE DRAWINGS

The drawings referenced herein form a part of the specification. Features shown in the drawing are meant as illustrative of only some embodiments of the invention, and not all embodiments of the invention unless otherwise explicitly indicated. Implications to the contrary are otherwise not to be made.

DETAILED DESCRIPTION

Figure 1:
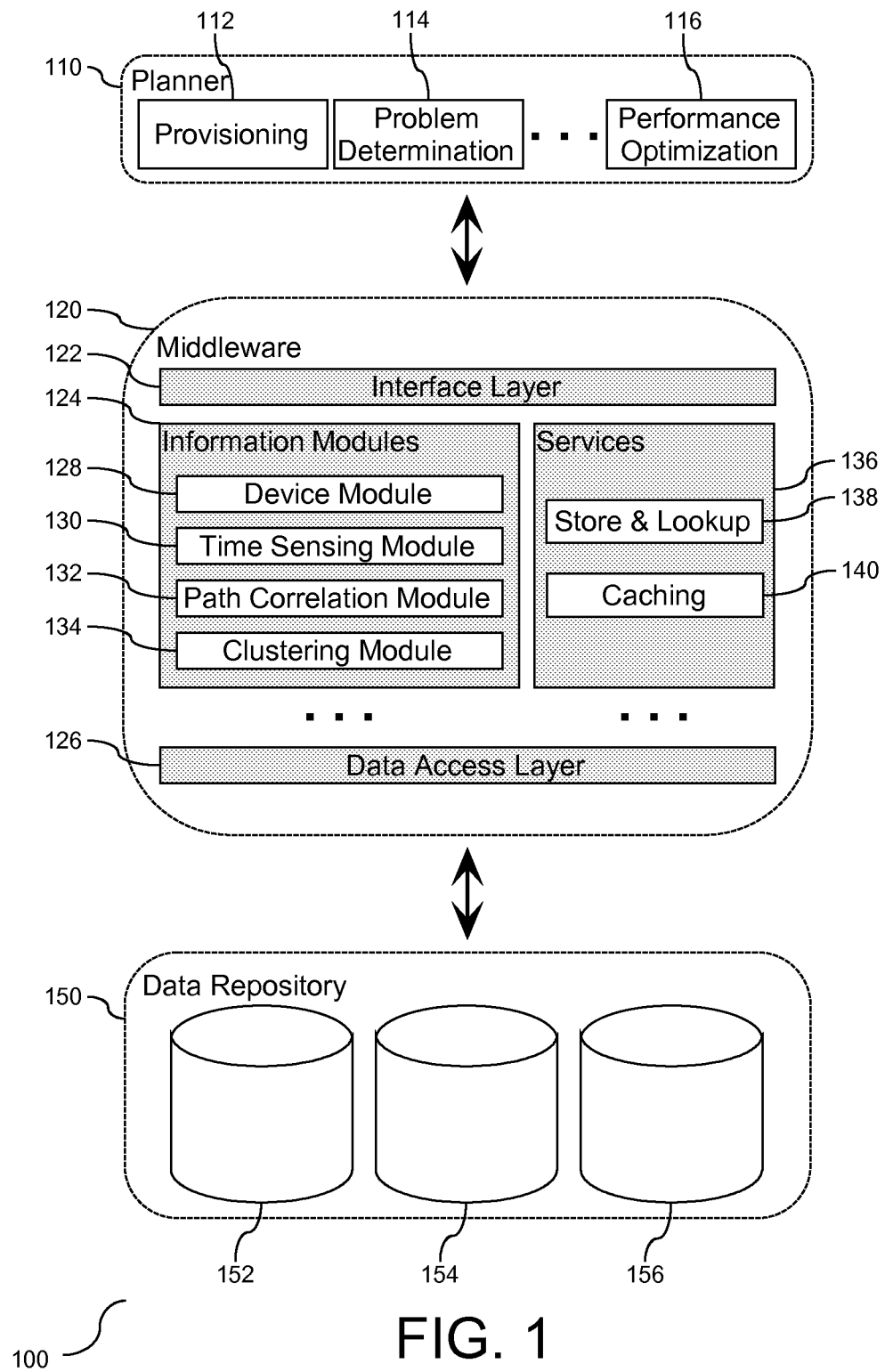
FIG. 1 is a block diagram of the components embedded in the middleware layer according to the preferred embodiment of this invention, and is suggested for printing on the first page of the issued patent.

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

The functional units described in this specification have been labeled as managers, planners, and modules. A manager, planner, and/or module may be implemented in programmable hardware devices such as field programmable gate arrays, programmable array logic, programmable logic devices, or the like. The manager, planner, and/or module may also be implemented in software for transaction by various types of processors. An identified manager, planner, and/or module of executable code may, for instance, comprise one or more physical or logical blocks of computer instructions which may, for instance, be organized as an object, procedure, function, or other construct. Nevertheless, the executables of an identified manager, planner, and/or module need not be physically located together, but may comprise disparate instructions stored in different locations which, when joined logically together, comprise the manager, planner, and/or module and achieve the stated purpose of the manager, planner, and/or module.

Indeed, a manager, planner, or module of executable code could be a single instruction, or many instructions, and may even be distributed over several different code segments, among different applications, and across several memory devices. Similarly, operational data may be identified and illustrated herein within the manager, planner, and/or module and may be embodied in any suitable form and organized within any suitable type of data structure. The operational data may be collected as a single data set, or may be distributed over different locations including over different storage devices, and may exist, at least partially, as electronic signals on a system or network.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

Furthermore, the described features, structures, or characteristics may be combined in any suitable manner in one or more embodiments. In the following description, numerous specific details are provided, such as examples of recovery manager, authentication module, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

Technical Details

In the following description of the embodiments, reference is made to the accompanying drawings that form a part hereof, and which shows by way of illustration the specific embodiment in which the invention may be practiced. It is to be understood that other embodiments may be utilized because structural changes may be made without departing form the spirit and scope of the present invention.

FIG. 1 is a block diagram (100) of the architecture of the computer system employing the novel middleware component. As shown, the architecture is comprised of three primary components, a planner (110), middleware (120), and a data repository (150). In a broad interpretation, the middleware (120) operates to bridge the planner (110) with the data repository (150). As shown herein, the data repository is comprised of a plurality of data storage modules (152), (154), and (156). Although only three data storage modules are shown herein, the invention should not be limited to the quantity of storage modules illustrated. The middleware (120) is employed to extract and maintain high level information about data storage using both statistical techniques and general knowledge.

As shown in FIG. 1, the middleware (120) is comprised of four components, including an interface layer (122), at least one information module (124), and a data access layer (126). The interface layer (122) serves as the interface between the middleware (120) and the planner (110) to channel communication between the information module (124) and the planner (110). In one embodiment, the interface layer (122) is comprised of one or more application program interfaces (APIs) for retrieving and manipulating information maintained in the data repository (150). Examples of APIs in the interface layer (122) include, but are not limited to, an API to predict an output device based upon input workload characteristics, and an API to provide a periodic pattern. Accordingly, the interface layer (122) is employed as a conduit between the planner (110) and the middleware (120).

The information module (124) of the middleware (120) is shown comprising four sub-modules, including a device module (128), a time sensing module (130), a path correlation module (132), and a clustering module (134). Each of the sub-modules (128)-(134) are employed to extract high level information constructs from raw data. More specifically, each of the different sub-modules (128)-(134) identify and extract core information constructs from raw data for use by the planner (110). In addition to the information module (124) and the associated sub-modules (128)-(134), the middleware (120) provides data management services (136) to encapsulate the raw data into information constructs. In one embodiment, the combination of the information module (124) and the data management services (136) is referred to as an information aggregation module. One example of an information construct includes, but is not limited to, building device models for disk arrays. The data management services (136) is comprised of a set of common services and optimization that different modules employ to efficiently maintain their information constructs. As shown herein, the common services include storage and lookup services (138) and caching services (144). In one embodiment, the information management services (136) may be enlarged to include additional service modules. The scope of the invention should not be limited to the quantity of information management services shown herein. Accordingly, the information module (124) and the data management services (136) are each comprised of one or more sub-modules to support their respective functionality and role in the middleware structure.

It is recognized in the art, that raw data is collected and retained in data storage for a finite period of time. The raw data may include time stamps and performance values of different metrics. The middleware (120) components apply information extraction functions to the data, including device modeling (128), time-series analysis (130), path correlation (132), and clustering of workload and device data (134). The output of device modeling (128) is a function that predicts performance based on input workload metrics of the device. In one embodiment, device models are employed for management tasks. Modeling techniques include training data, which includes historical observation of data and systematically deployed training workloads. In one embodiment, machine learning algorithms are employed to approximate the model, including regression methods and decision tree methods. Regression methods postulate a simple form of the model and then find parameter values that maximize the fit to the training data. Conversely, decision tree methods split training data based on entropy and variance. The time-series analysis (130) of the middleware (120) characterizes a workload based on historical behavior. In one embodiment, the time-series analysis (130) is used for predicting future behavior, analyzing patterns, etc. of the data series.

There are two primary categories of time-series analysis (130), time domain and frequency domain. Both of these domains are employed for trending and prediction. Data analysis in the time domain is frequently employed for trending and prediction. Examples of time domain include, but are not limited to auto regression integrated moving average (ARIMA) for determining order of components, and linear regression for trend calculation. Analysis in the frequency domain is employed for periodic and cyclical observations, including spectral analysis, harmonic analysis, periodogram analysis, and frequency domain analysis. In one embodiment, statistical measurement is employed to infer periodicity. The path correlation sub-module (132) is a selection of hardware elements, including but not limited to interconnected servers, server ports, fabric switch ports, controller ports, controller and disk arrays, etc. More specifically, the path correlation sub-module (132) employs the physical path followed by every request from the application. In one embodiment, path correlation pertains to the problem of determining mapping of each workload to different paths and links in the system. Path correlation functions are the basis for dependency discovery, impact analysis, and problem determination. Finally, the clustering sub-module (134) provides the functionality to identify clusters and isolate abnormal samples in multi-dimensional data. In one embodiment, this module (134) determines the typical workload characteristics. Similarly, in one embodiment, clustering application program interfaces (APIs) are employed to analyze performance problems. In one embodiment, determined abnormalities can be used for proactive problem determination. Accordingly, each sub-module (128)-(134) in the middleware (120) may be employed to support a planner for it's individual functionality with respect to the data and/or hardware configuration of the system.

As noted above, the modules and services in the middleware (120) are employed by one or more planners to administer tasks pertaining to data retained in the data repository (150). As shown herein, there are different categories of planners that may be employed, including a provisioning planner (112), a problem determination planner (114), and a performance optimization planner (116). Although only three planners are illustrated herein, the invention should not be limited to three planners, or necessarily to these categories of planners. In one embodiment, the system may include additional or different planners that employ the functionality of the modules in the middleware (120).

The provisioning planner (112) is invoked while deploying a new application or when changing the service level agreement (SLA) requirements of an existing application. The complexity of provisioning is dependent upon the scale and heterogeneity of the system infrastructure, fluctuations in usage characteristics of deployed applications, non-linear performance models of storage controllers, and current device utilization. In a given storage area network (SAN) based data center where application servers, Ser, are connected to storage controllers, S, via multiple tiers of fiber-channel switches, FC, the disks in the storage controllers are divided into one or more pools, Pool, containing multiple storage volumes, Vol, the goal of provisioning is to deploy an application within SLA requirements, Req. The output of the provisioning process is to deploy an optimal tuple of the set <Ser, Pool>, such that the SLA requirements are met and the connecting path between the Server and the Pool is minimally loaded.

The following is example pseudo code for a provisioning planner:

```
1:   Ser <- fetch from raw data repository
2:   Pool <- fetch from raw data repository
     //create model of pool and try adding the Req load
3:   for i=0; i < num pool; i ++) do
4:      PoolModel[i] <- creatModel(Pool[i])
5:      if tryAddWorkload (PoolModel[i], Req.iops) = = true then
6:         Add Pool to CandidatePool
7:      end if
8:   end for
9:   Similar steps for Server candidate list
10:  if (CandidatePool OR CandidateSer are empty) then
11:     Error: No placement found
12:     return null
13:  end if
     //List of connecting paths
14:  PathList <- findAllPaths (CandidatePool, CandidateSer)
15:  RankedPathList <- sortPath (Pathlist, Path.usage)
16:  Greedy Optimization Algorithm using CandidatePool, CandidateSer,
     RankedPathList
17:  return <Ser, Pool>
```

In the pseudo code shown above, all of the functions are shown in italics. The provisioning planner has a reduced quantity of calculations to the prior art equivalent because the middleware is employed to support the functionality. In other words, the calculations are performed in the middleware and not in the planner. The planner calls the middleware to support the calculation heavy functionality and mitigates the calculation(s) performed in the code of the planner.

At the time of application deployment, applications are provisioned to meet their SLA requirements. However, once the application(s) is deployed, there are scenarios in which variations to the application(s) may cause violation of the SLA requirements. Such scenarios include, but are not limited to, changes in workload characteristics, failure of one or more devices, mis-configuration in switch zoning, etc. The problem determination planner (114) is employed when the performance SLA is not being met for a given application workload. The following is a sample pseudo code for the problem determination planner:

```
1:   Devices <- Fetch devices from raw data repository
     // Check if the workload characteristics are abnormal
2:   WldCluster = createCluster (AppWld)
3:   isAbnormal (WldCluster, threshold)
4:   PRINT: Abnormal Workload
     // Check if the load on individual devices is abnormal
5:   for (i = 0; i < num devices; i ++) do
```

-continued

```
6:      DevCluster = createCluster (getDevice Load (Devices[i]))
7:      flag <- isAbnormal (DevCluster, currentLoad, threshold)
        //Threshold in terms of standard deviation
8:      if (flag = = true) then
9:          PRINT: Abnormal load for Devices[i]
10:     end if
11:   end for
12:   return
      // Create model of individual devices - check the response time
13:   for (i = 0; i < num devices; i ++) do
14:      DevModel <- createModel(Devices[i])
15:      predictResponse <- predictResponse(DevModel[i]
         currDevLoad[i])
16:      if ( - predictResponse - observedResponse - geq threshold) then
17:         PRINT: Abnormal device behavior
18:      end if
19:   end for
```

In the pseudo code shown above, all of the functions are shown in italics. The problem determination planner (114) has a reduced quantity of calculations to the prior art equivalent because the middleware (120) is employed to support the functionality. In other words, the calculations are performed in the middleware and not in the planner. In this example, the root causes are divided into three categories, including abnormality in individual workload characteristics, abnormality in device load, and abnormality in device behavior due to saturation, failures, or mis-configuration. Accordingly, similar to the provisioning planner (112), the problem determination planner (114) calls the middleware to support the calculation heavy functionality and mitigates the calculation(s) performed in the code of the planner to determine the aspect of the system that is causing violation of the SLA.

As shown in the architecture of the system, one of the elements in the middleware (120) are data management services (136). The information modules (124) generate a plurality of information constructs used by various management planners, including device models, time series models, etc. Performance of the planner is dependent on the ability of the middleware (120) to efficiently create, maintain, and access the information constructs. As data centers grow, such tasks become more complex. Data management services (136) include storage and lookup of created information constructs (138). In one embodiment, when a construct is created, it is stored on local disks with its entity name as the file name. The information module(s) (124) and the data management services (136) separate functionality of information extraction from information optimization logic within a planner calling both categories of modules (124) and (136). These files are stored in one or more hierarchical directories reflecting the physical hierarchy. For example, a disk array belonging to the same controller may be stored in a directory named after the controller. When a construct is requested, the system looks for the construct based on the entity name. If it is not in memory, the system looks for the performance data on local disk or retrieves the data from the raw repository of monitor software. Accordingly, logic is employed together with the data management services to store and retrieve constructs.

Another data management service (136) is known as a caching service (140). Most computation complexity revolves around information extracting from raw data access, developing models, and topology graph traversals. Caching and pre-fetching are two optimization techniques that mitigate such computation complexity. For the caching service (140) raw performance data and device models are both cached in memory using a configurable case size with least recently used (LRU) cache replacement. In one embodiment, the models and data in the cache are indexed on a hierarchical in-memory index that emulates the physical hierarchy. Accordingly, the caching service (140) ensures that most frequently accessed data and models are available in the main memory.

In one embodiment, the invention is implemented in software, which includes but is not limited to firmware, resident software, microcode, etc. The invention can take the form of a computer program product accessible from a computer-usable or computer-readable medium providing program code for use by or in connection with a computer or any instruction processing system. For the purposes of this description, a computer-usable or computer readable medium can be any apparatus that can contain, store, communicate, or transport the program for use by or in connection with the instruction processing system, apparatus, or device.

Figure 2:
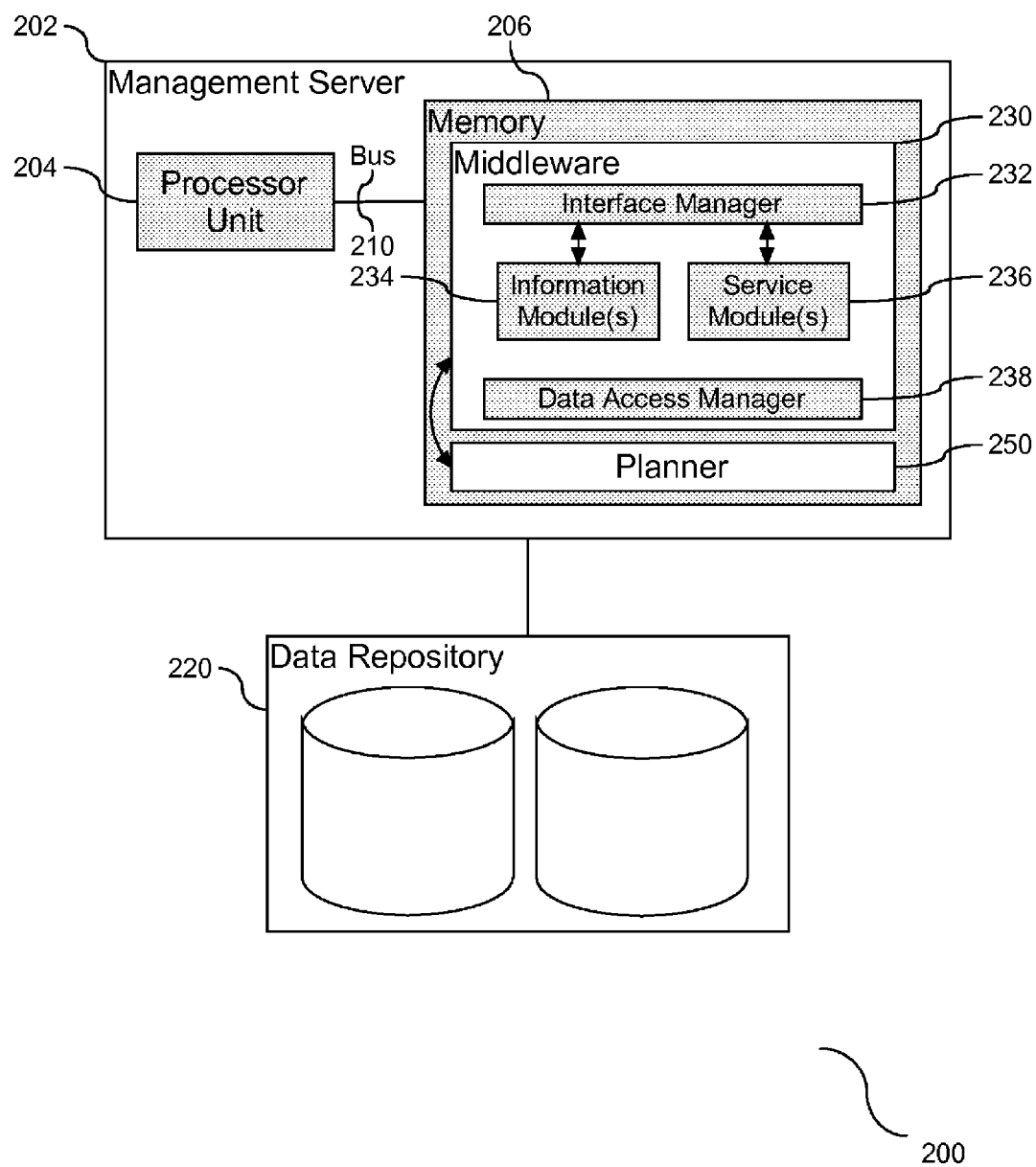
FIG. 2 is a block diagram illustrating a computer system and placement of the middleware and it's modules in the system.

FIG. 2 is a block diagram (200) illustrating placement of middleware and it's associated modules in a computer system. The illustration shows a computer system (202), in the form of a management server, with a processor unit (204) coupled to memory (206) by a bus structure (210). Although only one processor unit is shown, in one embodiment, the computer system (202) may include more processor units in an expanded design. The computer system (202) is in communication with a data repository (220).

Middleware (230) is provided local to the system to support the functionality of one or more planners. More specifically, the middleware (230) provides a common platform to support the functionality of the planner(s). This alleviates the need to replicate functionality in each planner, wherein the functionality would be local to the respective planner. As shown herein, the middleware (230) is local to memory (206). The middleware (230) includes the following: an interface manager (232), one or more information modules (234), one or more information service modules (236), and a data access manager (238). A planner (250) is provided local to memory (206) and in communication with the middleware (230). The interface manager (232) provides a communication medium between the planner (250) and the middleware modules (234) and (236). Similarly, the data access manager (238) provides a communication medium between the middleware modules (234) and (236) and the data repository (220). The modules (234) and (236) provide the planner (250) with a common platform for data extraction and management. By placing the managers (232) and (238) and modules (234) and (236) in the middleware (230), the functionality of the planner is maintained external to the planner and mitigates duplication of the functionality in each planner in the computer system.

As shown herein, the managers (232) and (238) and the modules (234) and (236) each reside in memory (206) local to the manager server (202). In one embodiment, the managers (232) and (238) and the modules (234) and (236) may reside as hardware tools external to local memory (206), or they may be implemented as a combination of hardware and software. Similarly, in one embodiment, the managers (232) and (238) and modules (234) and (236) may be combined into a single functional item that incorporates the functionality of the separate items. Furthermore, as shown herein, each of the managers (232) and (238) and modules (234) and (236) are local to the management server (202). However, in one embodiment, they may be collectively or individually distributed across the network and function as a unit to embody the functionality of individual planners. Accordingly, the manager (232) and (238) and modules (234) and (236) may be implemented as software tools, hardware tools, or a combination of software and hardware tools for managing the functionality of the planner in a distributed manner.

Embodiments within the scope of the present invention also include articles of manufacture comprising program storage means having encoded therein program code. Such program storage means can be any available media which can be accessed by a general purpose or special purpose computer. By way of example, and not limitation, such program storage means may include RAM, ROM, EEPROM, CD-ROM, DVD, or other optical disk storage, magnetic disk storage or other magnetic storage devices, or any other medium which can be used to store the desired program code means and which can be accessed by a general purpose or special purpose computer. Combinations of the above should also be included in the scope of the program storage means.

The medium can be an electronic, magnetic, optical, or semiconductor system (or apparatus or device). Examples of a computer-readable medium include a semiconductor or solid state memory, magnetic tape, a removable computer diskette, random access memory (RAM), read-only memory (ROM), a rigid magnetic disk, and an optical disk. Current examples of optical disks include compact disk B read only (CD-ROM), compact disk B read/write (CD-R/W) and DVD.

A data processing system suitable for storing and/or executing program code will include at least one processor coupled directly or indirectly to memory elements through a system bus. The memory elements can include local memory employed during actual transaction of the program code, bulk storage, and cache memories which provide temporary storage of at least some program code in order to reduce the number of times code must be retrieved from bulk storage during processing.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening networks.

The software implementation can take the form of a computer program product accessible from a computer-useable or computer-readable medium providing program code for use by or in connection with a computer or any instruction processing system.

Advantages over the Prior Art

Each planner employs functionality to support automation and or completion of tasks. In the prior art, the functionality of the planners are retained local to the planner, such that each planner is self contained. The modification disclosed herein removes the functionality from the planner and places it in a middleware layer that is accessible to all planners. APIs are employed to call one or more common functionalities from the middleware. By creating the middleware and restructuring the planner, a common platform is provided while reducing duplication of functionality with a plurality of planners.

Alternative Embodiments

It will be appreciated that, although specific embodiments of the invention have been described herein for purposes of illustration, various modifications may be made without departing from the spirit and scope of the invention. In particular, the middleware is a modular design that may be enlarged to provide extended services. New information modules and management services may be incorporated into the middleware. Similarly, optimizations in the data access layer may be employed to support different data schemas, and new interfaces layer application program interfaces (APIs) can be independently developed and incorporation into the interface layer. Accordingly, the scope of protection of this invention is limited only by the following claims and their equivalents.

We claim:

1. A method for configuration of at least one planner, comprising:
    configuring a computer system with the at least one planner in communication with a data repository through a middleware layer;
    extracting planning functionality, including information management functionality, from the at least one planner and placing it in the middleware layer, including providing a plurality of information aggregation modules within the middleware for sharing with each planner, the information aggregation modules extracting information management functionality comprising:
        defining and extracting information constructs from raw data stored in the data repository, the raw data including historical and performance data utilized by the at least one planner; and
        encapsulating the extracted raw data into high level information constructs; and
    the planner employing at least one of the information aggregation modules of the middleware through an application program interface call, wherein the extracted planning functionality including regression analysis, impact analysis, and workload analysis, to support the extracted information management functionality of the planner is performed in the middleware, including the extracted planning function of transforming the historical and performance data with the extracted information management functionality.

2. The method of claim 1, further comprising channeling communication between the information aggregation modules and the planner.

3. The method of claim 2, further comprising channeling communication between the data repository and the information aggregation modules.

4. The method of claim 3, further comprising shielding the information aggregation modules and the interface layer from direct interaction with the data repository.

5. The method of claim 1, further comprising separating functionality of information extraction from information optimization logic within a planner.

6. The method of claim 1, further comprising configuring the middleware for communicating with heterogeneous data repositories.

7. A computer system to configure at least one planner, comprising:
    a processor in communication with memory and a data repository;
    the at least one planner in communication with the data repository through a middleware layer;
    an information module to extract planning functionality, including information management functionality from the at least one planner and to place the extracted information management functionality in the middleware layer;
    the middleware layer having a plurality of modules to share with each planner, the modules comprising:
        an information module to define and extract information constructs from raw data stored in the data repository, the raw data including historical and performance data utilized by the at least one planner; and an information management service module to encapsulate the extracted raw data into high level information constructs; and the at least one planner to employ at least one of the modules of the middleware through an application program interface call, wherein the extracted planning functionality including regression analysis, impact analysis, and workload analysis, to support the extracted information management functionality of the at least one planner is performed in the middleware, including the extracted planning function of transforming the historical and performance data with the extracted information management functionality.

8. The system of claim 7, further comprising the middleware configured with an interface layer to channel communication between at least one of the modules and the planner.

9. The system of claim 8, further comprising the middleware configured with a data access layer to channel communication between the data repository and at least one of the modules.

10. The system of claim 9, further comprising the data access layer to shield at least one module and the interface layer from direct interaction with the data repository.

11. The system of claim 7, wherein the modules separate functionality of information extraction from information optimization logic within a planner calling both modules.

12. The system of claim 7, further comprising the middleware configured to communicate with heterogeneous data repositories.

13. A computer program product for configuration of at least one planner, the computer program product comprising:
a computer readable medium including a first program instruction to extract planning functionality, including information management functionality, from the at least one planner and to place the functionality in the middleware layer, including providing a plurality of information aggregation modules within the middleware to share with each planner;
a second program instruction in communication with the first program instruction, the second program instruction to define and extract information constructs from raw data and to encapsulate the extracted raw data into high level information constructs, the raw data including historical and performance data utilized by the at least one planner; and
the at least one planner to employ at least one of the information aggregation modules of through an application program interface call, wherein the extracted planning functionality including regression analysis, impact analysis, and workload analysis, to support the extracted information management functionality of the at least one planner is performed in the middleware, including the extracted planning function of transforming the historical and performance data with the extracted information management functionality.

14. The article of claim 13, further comprising an interface layer in the middleware to channel communication between the information aggregation modules and the planner.

15. The article of claim 14, further comprising a data access layer in the middleware to channel communication between the data repository and the instruction to define and extract information constructs from raw data.

16. The article of claim 14, further comprising a third program instruction to shield the information aggregation modules and the interface layer from direct interaction with the data repository.

17. The article of claim 13, further comprising the information module and the third instruction to separate functionality of information extraction from information optimization logic within a planner calling both the information module and the information extraction instruction.

18. The article of claim 13, further comprising a fourth program instruction to communicate with heterogeneous data repositories.

19. A method for invoking at least two planners through middleware, comprising:
configuring a computer system with the at least two planners in communication with a data repository through a middleware layer;
extracting planning functionality, including information management functionality, from the at least two planners;
placing the extracted functionality in the middleware layer;
defining and extracting information constructs from raw data, the raw data including historical and performance data utilized by the at least two planners, and encapsulating the extracted raw data into high level information constructs; and
supporting the extracted information management functionality of the at least one two planners, including performing the extracted planning functionality including regression analysis, impact analysis, and workload analysis, in the middleware layer, including the extracted planning function of transforming the extracted historical and performance data with the extracted management functionality.

20. The method of claim 19, further comprising embedding a information module in the middleware layer and sharing the embedded module with each planner.

* * * * *